(12) United States Patent
Yang et al.

(10) Patent No.: US 9,889,783 B2
(45) Date of Patent: Feb. 13, 2018

(54) ASSIST HANDLE FOR CAR

(71) Applicant: NIFCO KOREA INC., Cheonan-si, Chungcheongnam-do (KR)

(72) Inventors: Hyo Keun Yang, Cheonan-si (KR); Chang Sun Hong, Cheonan-si (KR)

(73) Assignee: NIFCO KOREA INC., Cheonan-si, Chungcheongnam-Do (KR)

( * ) Notice: Subject to any disclaimer, the term of this patent is extended or adjusted under 35 U.S.C. 154(b) by 0 days.

(21) Appl. No.: 15/035,609

(22) PCT Filed: Nov. 10, 2014

(86) PCT No.: PCT/KR2014/010752
§ 371 (c)(1),
(2) Date: May 10, 2016

(87) PCT Pub. No.: WO2015/069078
PCT Pub. Date: May 14, 2015

(65) Prior Publication Data
US 2016/0297340 A1    Oct. 13, 2016

(30) Foreign Application Priority Data
Nov. 11, 2013 (KR) ........................ 10-2013-0136369

(51) Int. Cl.
*B60N 3/02* (2006.01)

(52) U.S. Cl.
CPC .................................... *B60N 3/026* (2013.01)

(58) Field of Classification Search
CPC ........ B60N 3/026; B60N 3/023; Y10T 16/458
See application file for complete search history.

(56) References Cited

U.S. PATENT DOCUMENTS

| 7,103,939 B2 * | 9/2006 | Belchine, III | B60N 3/023 16/412 |
| 7,308,736 B2 * | 12/2007 | Nakazato | B60N 3/026 24/289 |
| 8,245,357 B2 * | 8/2012 | Kajio | B60N 3/023 16/444 |

FOREIGN PATENT DOCUMENTS

| JP | H07-035168 U | 6/1995 |
| JP | 2006-175990 A | 7/2006 |

(Continued)

OTHER PUBLICATIONS

PCT International Search Report of PCT/KR2014/010752.

*Primary Examiner* — Pinel E Romain
(74) *Attorney, Agent, or Firm* — Manabu Kanesaka (57) ABSTRACT

An assist handle for a car includes an assist handle having mounting spaces and hinge grooves; main brackets positioned in the mounting spaces of the assist handle and having fitting protrusions, clip insertion holes and hinge shafts fitted into the hinge grooves on one side of the mounting spaces; auxiliary brackets having coupling plates provided with hook fixing holes overlapping front portions of body portions of the main brackets and hinge shafts fitted into the hinge grooves on another side of the mounting spaces; fixing clips adapted to couple to the body panel of the car at one side and inserted into the clip insertion holes at the other side such that holding pieces are placed at the same positions as the hook fixing holes; and hooks fitted into the holding pieces and the hook fixing holes to fix the fixing clips, the main brackets and the auxiliary brackets.

7 Claims, 5 Drawing Sheets

(56) References Cited

FOREIGN PATENT DOCUMENTS

| JP | 2010-159032 | A | 7/2010 |
|---|---|---|---|
| KR | 10-1071977 | B1 | 10/2011 |

* cited by examiner

ASSIST HANDLE FOR CAR

CROSS-REFERENCES TO RELATED APPLICATIONS

The present application is National Phase of International Application No. PCT/KR2014/010752 filed Nov. 10, 2014, and claims priority from Korean Application No. KR 10-2013-0136369 filed Nov. 11, 2013, the disclosure of which is incorporated herein.

TECHNICAL FIELD

The present invention relates to an assist handle for a car, wherein the assist handle can be mounted by own fixing means without using any additional coupling members, and hinge parts thereof are prevented from being exposed so as to improve the appearance of the assist handle.

BACKGROUND ART

Figure 1:
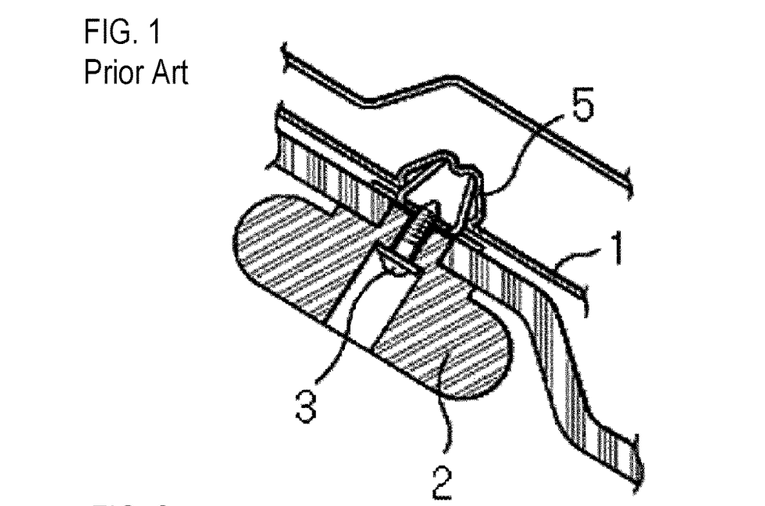
FIG. 1 is a front view showing the coupling state of a prior art assist handle.

In general, an assist handle for a car denotes an auxiliary handle which is provided to a head liner in the proximity of the door of a passenger's seat such that a passenger can use the same for maintaining his balance. Referring to FIG. 1, an assist handle according to a prior art has a body panel 1 coupled to a fixing clip 5 having elasticity and an assist handle 2 fixed to the fixing clip 5 by means of a tapping screw 3.

However, the prior art assist handle has disadvantages that the mounting of the assist handle to the body panel takes too much time, deteriorating productivity, and the fixing clip once mounted is not easily decoupled so that the change or repair of the fixing clip is difficult so far.

In order to resolve the above problems, Korean Patent No. 10-1071977 discloses a mounting module, wherein an assist handle can be simply fixed to or separated from a body panel without using a tapping screw.

Figure 2:
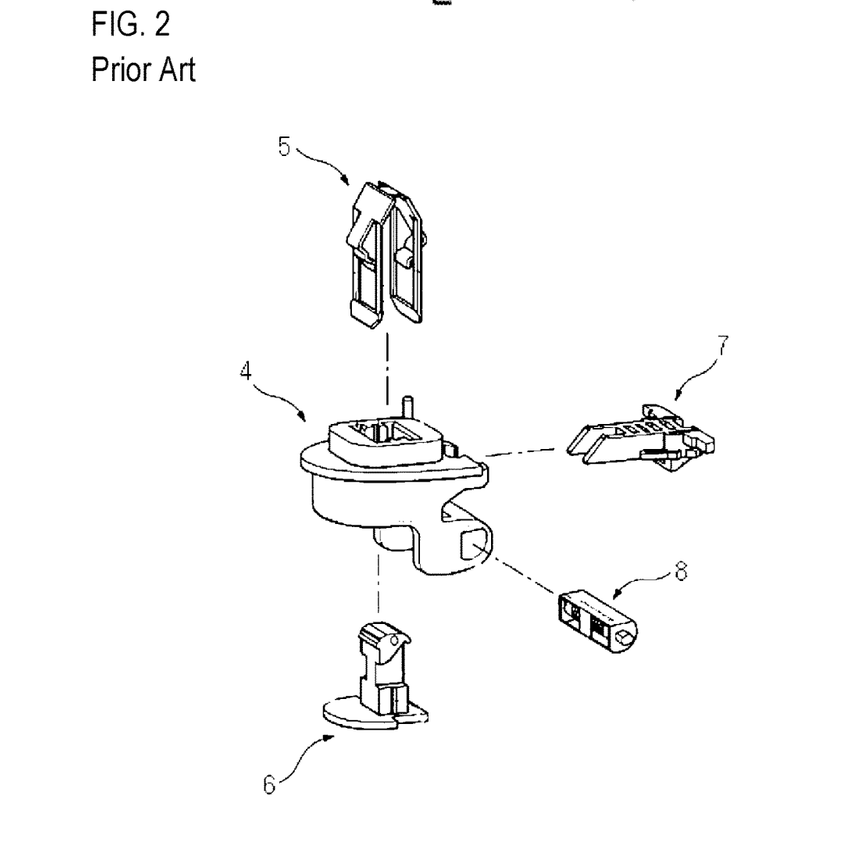
FIG. 2 is an exploded perspective view showing the prior art assist handle.

That is, according to the above technique, the mounting module for fixing an assist handle to a body panel includes a clip support 6 for supporting a fixing clip 5 coupled to a body part 4, a fixing pin 7 for fixing the fixing clip 5 and the clip support 6, and a return spring 8 for applying restoring force to the assist handle, as shown in FIG. 2.

Therefore, the assist handle can be simply fixed to the body panel by using the mounting module but not using a tapping screw, and the mounting module can be easily separated by simply decoupling the fixing pin.

According to the above prior art technique, such mounting modules are provided to both ends of the assist handle so as to rotate the assist handle and return to close contact with the inside surface of a vehicle after a passenger has used the same.

However, the above prior art technique still has a problem that the elasticity of the return spring is excessively transmitted in the process of returning the assist handle such that the returning speed of the assist handle is too fast or a part thereof collides with the inside surface of the vehicle, generating noise.

Further, the mounting module is formed of a plurality of separate parts, causing the difficulties in the maintenance thereof together with the increase in the cost of materials and the assembling work.

PRIOR ART DOCUMENT

Patent Document

Patent Document 1: Korean Patent Publication No. 10-1071977, vehicle assist handle mounting module (registered on Oct. 4, 2011)

DISCLOSURE OF INVENTION

Technical Problem

The present invention has been made so as to resolve the above-described problems, and its objective is to provide an assist handle for a car, wherein fixing means for fixing the assist handle to a body panel are provided to be coupled to the inside of the both ends of the assist handle such that any hinge part thereof is prevented from being exposed to the outside.

Another objective of the present invention is to provide an assist handle of a car, wherein a damper and a return spring are respectively provided to the fixing means which are coupled to the both ends of the assist handle such that the returning of the assist handle is smoothly carried out, thereby improving the performance thereof.

Still another objective of the present invention is to provide an assist handle of a car, wherein the number of the parts of the fixing means is reduced, thereby promoting the cost reduction and the simplification of the assembling work while securing the simple separation of the parts in the case of change or repair.

Solution to Problem

In order to achieve the above and any other objectives of the present invention, an assist handle for a car, comprises:

an assist handle 10 having mounting spaces 11a, 11b formed at both end portions of the handle and hinge grooves 12a, 12b provided to the mounting spaces 11a, 11b;

main brackets 20 positioned in the mounting spaces 11a, 11b of the assist handle 10 and having fitting protrusions 22 protruding from one surface of each of base plates 21 which contact the body panel of a car, body portions 23 provided to the other side surface of each of the base plates 21 and formed with hook fixing holes 23a, clip insertion holes 24 provided at one side of the front portion of each of the body portions 23 by penetrating the base plates 21 at positions corresponding to the both ends of the fitting protrusions 22 and hinge shafts 25 provided at the other side of the front portion of each of the body portions 23 so as to be fitted into the hinge grooves 12a at one sides of the mounting spaces 11a, 11b;

auxiliary brackets 30 positioned such that coupling plates 31 having hook fixing holes 31a overlap the front portions of the body portions 23 of the main brackets 20 and hinge shafts 32 are fitted into the hinge grooves 12b at the other sides of the mounting spaces 11a, 11b;

fixing clips 40 each having one end coupled to the body panel of a car and the other end inserted into the clip insertion holes 24 while encompassing the fitting protrusions 22 at the lower portions of the base plates 21 of the main brackets 20 such that holding pieces 42 formed at both end portions which are inserted into the clip insertion holes 24 are placed at the same positions as the hook fixing holes 23a, 31a; and hooks 50 fitted into the holding pieces 42 and the hook fixing holes 23a, 31a so as to fix the fixing clips 40, the main brackets 20 and the auxiliary brackets 30.

Further, the hinge shafts 25, 32 provided on the outside surfaces of the main brackets 20 and the auxiliary brackets 30 are coupled to the hinge grooves 12a, 12b provided to the mounting spaces 11a, 11b of the assist handle 10 and the both end portions of shafts 60 are respectively fixed to the inside surfaces of the main brackets 20 and the auxiliary brackets 30 in the horizontal center portions of the hinge shafts 25, 32. Furthermore, one mounting space 11a of the mounting spaces 11a, 11b provided at the both ends of the assist handle 10 is further provided with a damper 61 such that the damper 61 is coupled to one of the shafts 60 so as to control the rotation speed of the assist handle 10, and the other one mounting space 11b of the mounting spaces 11a, 11b provided at the both ends of the assist handle 10 is further provided with a return spring 62 such that one end of the return spring 62 is fitted into the other one of the shafts 60 and supported by the assist handle 10 and the other one end is supported by one of the main bracket 20 so as to restore the assist handle 10.

In addition, the assist handle for a car further comprises covers 55 positioned in the mounting spaces 11a, 11b of the assist handle 10 and encompassing the main brackets 20 and the auxiliary brackets 30 which are exposed in front of the body portions 23 at the upper portions of the base plates 21.

Advantageous Effects of Invention

According to the present invention in the above configuration, the assist handle is mounted by the fixing means on the body panel of a vehicle but the hinge parts for the rotation of the handle is not exposed, thereby improving the appearance.

Further, the damper and the return spring are provided to the assist handle such that the returning of the assist handle is smoothly carried out, thereby improving the performance thereof.

In addition, the number of the parts of the fixing means is reduced, thereby promoting the cost reduction and the simplification of the assembling work while securing the simple separation of the parts in the case of change or repair.

MODE FOR THE INVENTION

Hereinafter, embodiments of the present invention will now be described with respect to the configuration in detail with reference to the drawings.

An assist handle for a car according to the present invention is derived to be mounted by own fixing means but without using any additional coupling members and to prevent the exposure of the hinge parts thereof so as to improve the appearance thereof.

Figure 3:
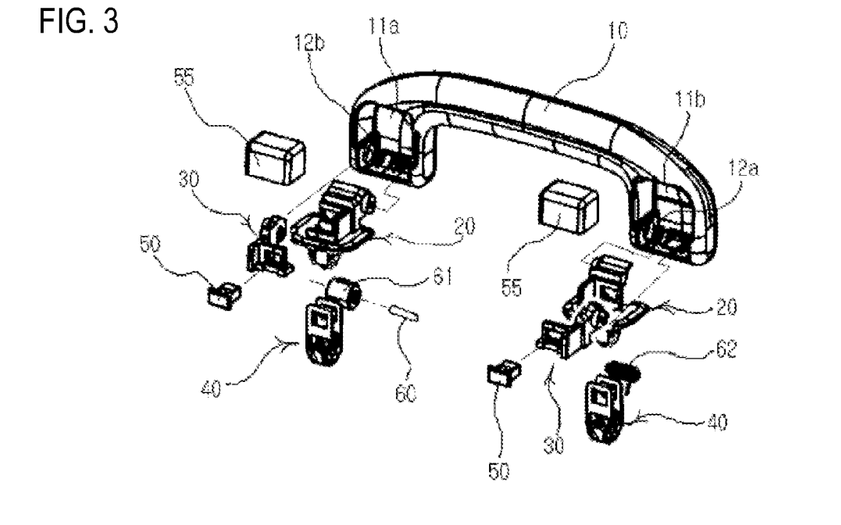
FIG. 3 is an exploded perspective view showing an assist handle, to which the technique of the present invention is applied.
Figure 4A:
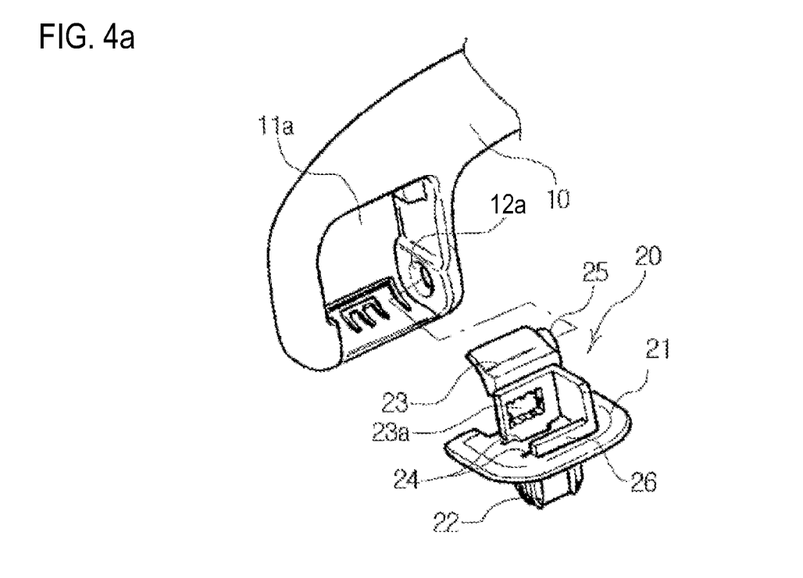
FIGS. 4a-4f are perspective views showing the sequence for coupling a fixing means according to the present invention.
Figure 4B:
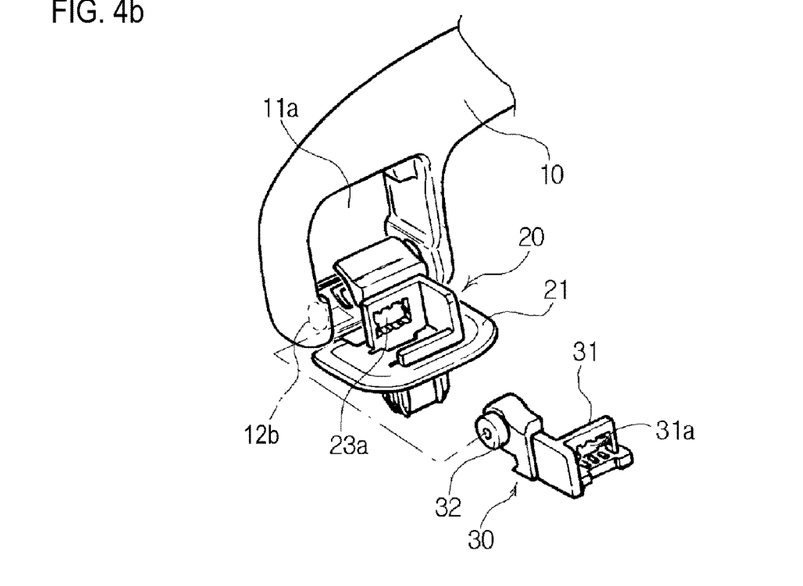
Figure 4C:
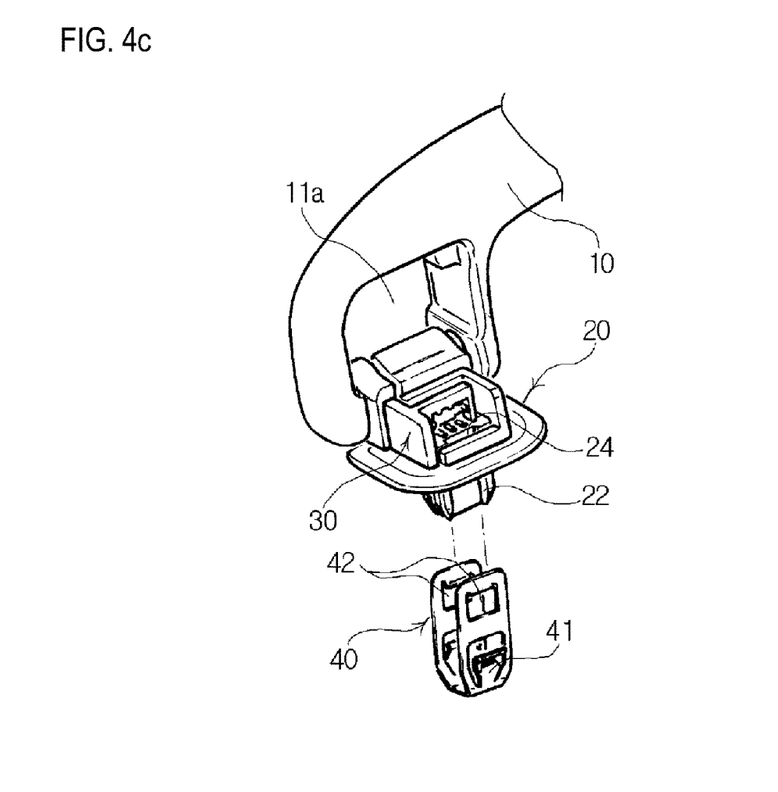
Figure 4D:
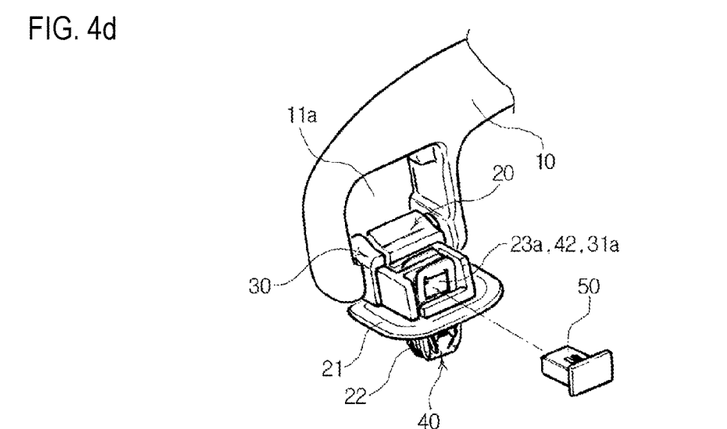
Figure 4E:
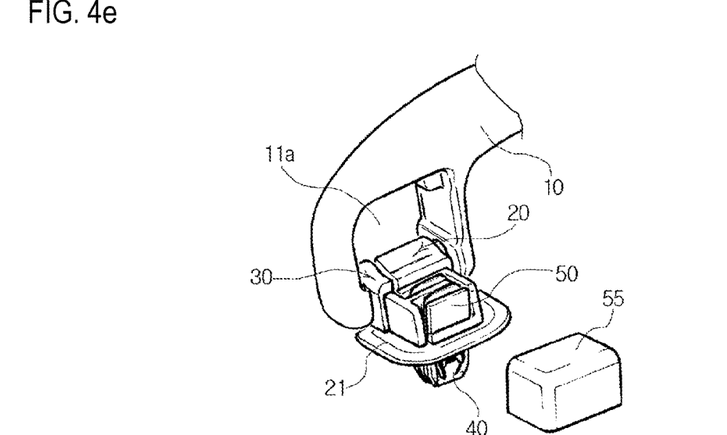
Figure 4F:
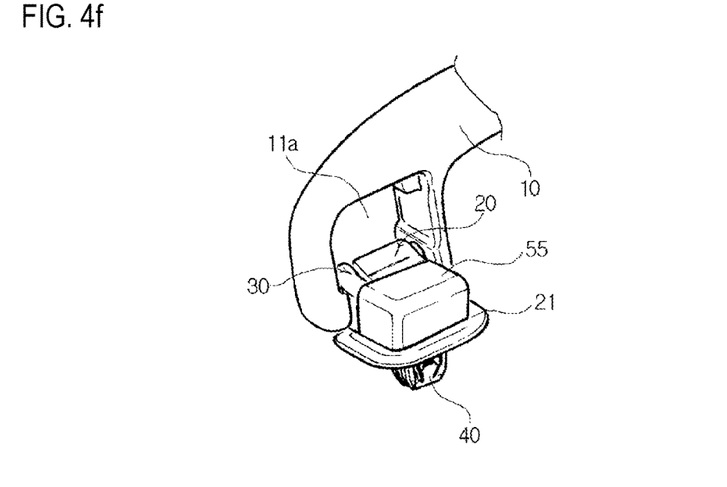
Figure 5:
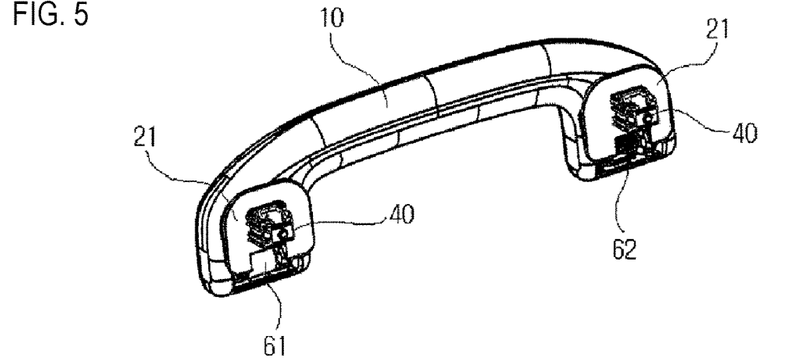
FIG. 5 is a perspective view showing the coupling state of the assist handle according to the present invention.

Referring to FIG. 3 to FIG. 5, an assist handle 10 mounted on the body panel of a car has mounting spaces 11a, 11b formed at both end portions of the handle, wherein fixing means are coupled to the mounting spaces 11a, 11b such that the fixing means prevent the exposure of hinge parts for the rotating the assist handle 10 and fixing clips 40 composing the fixing means are formed to be simply mounted on the body panel.

To this end, the fixing means mainly includes main brackets 20 and auxiliary brackets 30 which are provided to the assist handle 10, fixing clips 40 coupled to the body panel of the assist handle 10 are fixed to the main brackets 20 and the auxiliary brackets 30 by means of hooks 50, and a damper 61 and a return spring 62 for applying restoring force to the assist handle 10.

Explaining the assembling work according to the present invention in more detail, the mounting spaces 11a, 11b are provided to the both end portions of the assist handle 10 as shown in FIG. 4a, wherein the mounting spaces 11a, 11b have hinge grooves 12a, 12b and the main brackets 20 are positioned from the front portion of the mounting spaces 11a, 11b.

The main brackets 20 are inserted into the mounting spaces 11a, 11b of the assist handle 10 and are formed in a shape, in which fitting protrusions 22 protrude from one surface of each of base plates 21 which contact the body panel of a car, and body portions 23 are provided to the other side surface of each of the base plates 21 and formed with hook fixing holes 23a.

Further, clip insertion holes 24 are provided at one side of the front portion of each of the body portions 23 by penetrating the base plates 21 at positions corresponding to the both ends of the fitting protrusions 22, and hinge shafts 25 are provided at the other side of the front portion of each of the body portions 23 so as to be fitted into the hinge grooves 12a at one side of the mounting spaces 11a, 11b.

Therefore, the auxiliary brackets 30 are assembled as shown in FIG. 4b in a state, in which the hinge shafts 25 at one side of each of the main brackets 20 are fitted into the hinge grooves 12a in the mounting spaces 11a, 11b.

The auxiliary brackets 30 are formed in a shape, in which the auxiliary brackets 30 are positioned such that coupling plates 31 having hook fixing holes 31a overlap the front portions of the body portions 23 of the main brackets 20 and hinge shafts 32 are fitted into the hinge grooves 12b at the other sides of the mounting spaces 11a, 11b.

At this time, the main brackets 20 are assembled into the mounting spaces 11a, 11b. Therefore, the assembling work of the auxiliary brackets 30 is carried out such that the auxiliary brackets 30 are rotated without interference with the main brackets 20, wherein the hinge shafts 32 are fitted into the hinge grooves 12b and the auxiliary brackets 30 are reversely rotated such that the coupling plates 31 are placed on top of the base plates 21.

Further, the main brackets 20 are further formed with movement prevention projections 26 such that, if the coupling plates 31 of the auxiliary brackets 30 are placed on top of the base plates 21, the coupling plates 31 are held by the movement prevention projections 26, thereby promoting the convenience of assembling work and preventing the movement of the auxiliary brackets 30.

As described above, the hinge shafts 25, 32 of the main brackets 20 and the auxiliary brackets 30 in the mounting spaces 11a, 11b are respectively coupled to the hinge grooves 12a, 12b at both sides and the main brackets 20 and the auxiliary brackets 30 placed on top of the base plates 21 of the main brackets 20 become rotatable.

In addition, the fixing clips 40 coupled to the body panel of a car are inserted from the lower portions of the main brackets 20 as shown in FIG. 4c.

The fixing clips 40 are formed in the shape of a plate of which both ends are folded upwards so as to encompass the fitting protrusions 22 of the main brackets 20, and have holding pieces 41 having elasticity, which are formed by projecting and folding the center portions of the both side surfaces of the fixing clips 40 to the outside, and holding pieces 42 corresponding to the hook fixing holes 23a, 31a, which are formed at the upper portions thereof.

Therefore, the fixing clips 40 are coupled to the body panel of a car by using the holding pieces 41, wherein the both end portions thereof are inserted into the clip insertion holes 24 while encompassing the fitting protrusions 22 at the lower portions of the base plates 21 of the main brackets 20 such that the holding pieces 42 formed at the inserted both end portions are placed at the same positions as the hook fixing holes 23a, 31a.

In a state, in which the fixing clips 40 are inserted as above, the hooks 50 are fitted into the holding pieces 42 and the hook fixing holes 23a, 31a as shown in FIG. 4d such that the fixing clips 40, the main brackets 20 and the auxiliary brackets 30 are integrally fixed.

Further, the exposed portions of the main brackets 20, the auxiliary brackets 30 and the fixing clips 40 which are mutually coupled using the hooks 50 as shown in FIG. 4e are provided with covers 55 at the upper portions of the base plates 21 so as to prevent the exposed portions of the main brackets 20, the auxiliary brackets 30 and the fixing clips 40 from being exposed to the outside.

Therefore, the covers 55 prevent the assembled states of the internal constituent elements from being exposed to the outside at the time of the rotation of the assist handle 10 as shown in FIG. 4f, thereby, improving the appearance of the assist handle 10.

Figure 6:
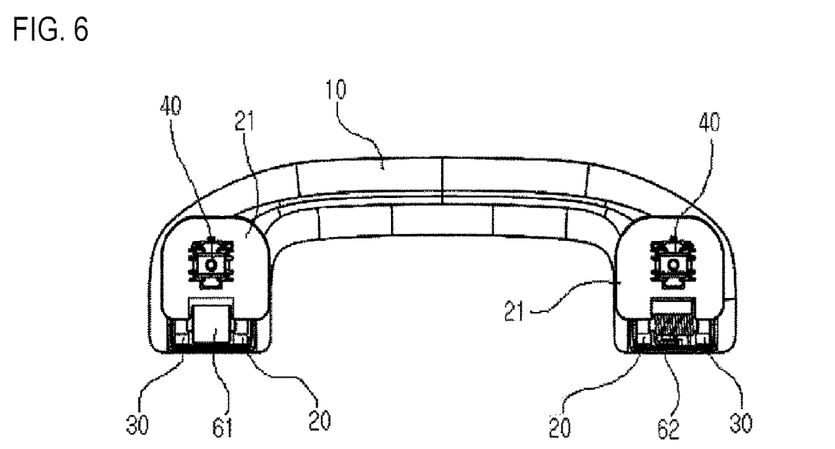
FIG. 6 is a front view showing the coupling state of the assist handle according to the present invention.
Figure 7:
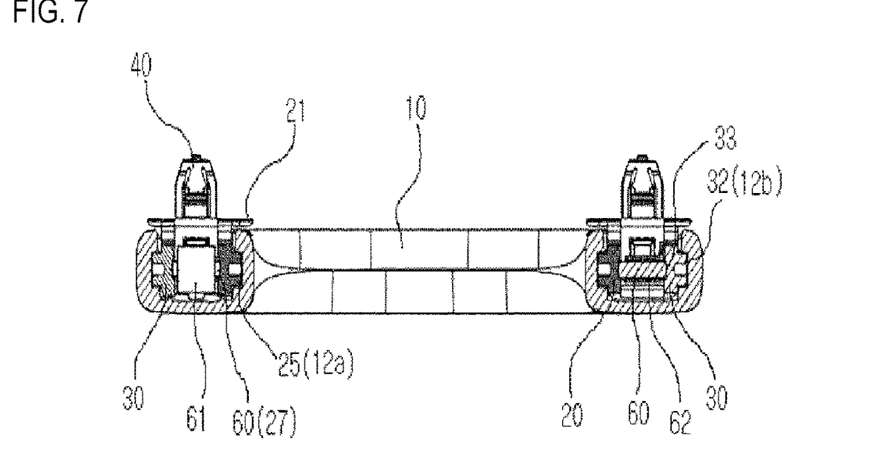
FIG. 7 is a cross-sectional view of the assist handle according to the present invention.

In a state, in which the fixing means are respectively coupled to the mounting spaces 11a, 11b at the both end portions of the assist handle 10 as above, a damper 61 and a return spring 62 are further provided to each of the fixing means as shown in FIG. 5 to FIG. 7.

To this end, the hinge shafts 25, 32 formed on the outside surfaces of the main brackets 20 and the auxiliary brackets 30 are coupled to the hinge grooves 12a, 12b provided to the mounting spaces 11a, 11b of the assist handle 10, and the main brackets 20 and the auxiliary brackets 30 are further provided with axial grooves 27, 33 in the horizontal center portions of the hinge shafts 25, 32 so as to respectively fix the both end portions of the shafts 60.

In addition, the shafts 60 coupled to the brackets at the both ends of the assist handle 10 are further provided with the damper 61 and the return spring 62 respectively so as to control the return speed of the assist handle 10.

That is, the fixing means coupled to one mounting space 11a at one end of the assist handle 10 is provided with the damper 61 such that the damper 61 controls the rotation speed of the assist handle 10 at the time of the returning of the assist handle 10, while the fixing means coupled to the other one mounting space 11b is provided with the return spring 62 such that the return spring 62 applies restoring force to the assist handle 10 so as to return the assist handle 10.

The damper 61 is coupled to the mounting space 11a of the assist handle 10 as a deceleration means so as to decrease the returning speed of the assist handle 10 at the time of the returning of the assist handle 10, thereby reducing noise. At this time, the shaft 60 in the center portion of the body of the damper is coupled to the axial grooves 27, 33 of the main bracket 20 and the auxiliary bracket 30 in a state, in which the body of the damper is fixedly fitted into the main bracket 20, so as to prevent the movement of the brackets and to control the rotation speed.

Further, the fixing means coupled to the mounting space 11b at one other end of the assist handle 10 is provided with the return spring 62 fitted into the shaft 60 such that one end of the return spring 62 is supported on the inner wall of the mounting space 11b of the assist handle 10 and the other end is supported by the main bracket 20, so as to apply restoring force for returning the assist handle 10.

According to the assist handle 10 as structured above, the assist handle 10 comes into close contact with the body panel of a car after a passenger has used the same. Therefore, the fixing means in the mounting spaces 11a, 11b are not exposed to the outside. In addition, the assist handle 10 becomes a uniform speed when returning, thereby improving the quality of the product.

Further, the assist handle 10 can be separated from the fixing means by decoupling the covers 55 and the hooks 50 after rotating the assist handle 10. Therefore, the main brackets 20, the auxiliary brackets 30 and the fixing clips 40 can be simply separated, promoting the change or repair of the same.

The embodiments described above are to be understood as a few illustrative examples of the present invention and the present invention is not limited to the embodiments and the drawings. It will be understood by those skilled in the art that various modifications, combinations and changes may be made to the embodiments without departing from the scope of the present invention.

BRIEF EXPLANATION OF REFERENCE SYMBOLS

10—Assist handle 11a, 11b—Mounting spaces
12a, 12b—Hinge grooves 20—Main brackets
21—Base surfaces 22—Fitting protrusions
23—Body portions 23a—Hook fixing holes
24—Clip insertion holes 25—Hinge shafts
30—Auxiliary brackets 31—Coupling plates
31a—Hook fixing holes 32—Hinge shafts
40—Fixing clips 41—Holding pieces
42—Holding pieces 50—Hooks
55—Cover 60—Shafts
61—Damper 62—Return spring

What is claimed is:

1. An assist handle for a car, comprising:
an assist handle having mounting spaces each being formed at two end portions of the assist handle and hinge grooves provided in the mounting spaces;
main brackets positioned in the mounting spaces of the assist handle and each of the main brackets having
a base plate adapted to contact a body panel of the car,
a fitting protrusion protruding from one surface of the base plate,
a body portion provided on another surface of the base plate and formed with a hook fixing hole, clip insertion holes provided at one side of a front portion of the body portion by penetrating the base plate at positions corresponding to two ends of the fitting protrusion, and one hinge shaft provided at another side of the front portion of the body portion to be fitted into the hinge groove at one side of the mounting space;

auxiliary brackets formed separately from the main brackets, each including a coupling plate having a hook fixing hole to be arranged to overlap the front portion of the body portion of the main bracket, and another one hinge shaft fitted into another hinge groove at another side of the mounting space; and fixing clips formed separately from the main brackets and the auxiliary brackets, each having one end adapted to couple to the body panel of the car and another ends inserted into the clip insertion holes while encompassing the fitting protrusion at a lower portion of the base plate of the main bracket such that holding pieces formed at two end portions of the another ends which are inserted into the clip insertion holes are placed at a same position as the hook fixing holes of the main bracket and the auxiliary bracket.

2. The assist handle for the car according to claim 1, wherein the hinge shafts provided on outside surfaces of the main brackets and the auxiliary brackets are coupled to the hinge grooves provided in the mounting spaces of the assist handle, and two end portions of shafts are respectively fixed to inside surfaces of the main brackets and the auxiliary brackets in horizontal center portions of the hinge shafts.

3. The assist handle for the car according to claim 2, wherein one mounting space of the mounting spaces provided at the two ends of the assist handle is further provided with a damper coupled to one of the shafts to control a rotation speed of the assist handle.

4. The assist handle for the car according to claim 2, wherein another mounting space of the mounting spaces provided at the two ends of the assist handle is further provided with a return spring having one end fitted into another of the shafts and supported by the assist handle and another end supported by one of the main brackets to restore the assist handle.

5. The assist handle for the car according to claim 1, further comprising covers positioned in the mounting spaces of the assist handle and encompassing the main brackets and the auxiliary brackets which are exposed in front of the body portions at upper portions of the base plates.

6. The assist handle for the car according to claim 1, further comprising hooks formed separately from the main brackets, the auxiliary brackets and the fixing clips, each hook being fitted into the holding pieces and the hook fixing holes of the main bracket and the auxiliary bracket to fix the fixing clips, the main brackets and the auxiliary brackets.

7. The assist handle for the car according to claim 6, wherein the main bracket and the auxiliary bracket are assembled such that the one hinge shaft protrudes at one side of the main bracket, and the another one hinge shaft protrudes at one side of the auxiliary bracket opposite to the one side of the main bracket.

\* \* \* \* \*